United States Patent [19]

Morgan et al.

[11] Patent Number: 5,044,324

[45] Date of Patent: Sep. 3, 1991

[54] WOOD FIBER CRUMBLES

[75] Inventors: William M. Morgan, Hoquiam; Bill E. Williams, Olympia, both of Wash.

[73] Assignee: Mountain Cat, Inc., Lacey, Wash.

[21] Appl. No.: 321,390

[22] Filed: Apr. 24, 1989

[51] Int. Cl.$^5$ .............................................. A01K 29/00
[52] U.S. Cl. ...................................................... 119/171
[58] Field of Search ............................ 119/1, 171, 172

[56] References Cited

U.S. PATENT DOCUMENTS

| | | | |
|---|---|---|---|
| 3,828,731 | 8/1974 | Waite | 119/1 |
| 3,941,090 | 3/1976 | Fry | 119/1 |
| 3,980,050 | 9/1976 | Neubauer | 119/172 |
| 4,157,696 | 6/1979 | Carlberg | 119/1 |
| 4,258,659 | 3/1981 | Rowell | 119/1 |
| 4,305,345 | 12/1981 | Otoguro | 119/1 |
| 4,355,593 | 10/1982 | Stapley | 119/1 |
| 4,386,579 | 6/1983 | Harsh et al. | 119/1 |
| 4,618,496 | 10/1986 | Brasseur | 119/1 X |
| 4,619,862 | 10/1986 | Sokolowski et al. | 119/1 X |
| 4,621,011 | 11/1986 | Fleischer et al. | 119/172 X |
| 4,676,196 | 6/1987 | Lojek et al. | 119/1 |
| 4,788,936 | 12/1988 | Billings | 119/1 |
| 4,794,022 | 12/1988 | Johnson et al. | 119/1 X |
| 4,827,871 | 5/1989 | Morrison | 119/171 |
| 4,924,808 | 5/1990 | Pirotte | 119/171 |

*Primary Examiner*—Gene Mancene
*Assistant Examiner*—R. Thomas Price
*Attorney, Agent, or Firm*—Brian J. Coyne

[57] ABSTRACT

This invention is for wood fiber crumbles, and a method for making the same, for use as an animal litter, a petroleum spill absorbent, floor sweeping material, and mulch. Grists of an assortment of types of wood are combined and admixed, dried, moisturized, pelletized, and ground to form crumbles. Depending upon the selection types of wood utilized, the crumbles are capable of rapidly and efficiently absorbing animal excretions and petroleum, minimizing unpleasant odors, restricting the growth of microorganisms, repelling insect pests, and adding or removing nitrogen to soil when used as a mulch.

14 Claims, No Drawings

WOOD FIBER CRUMBLES

BACKGROUND OF THE INVENTION

1. Field of the Invention:

This invention relates to wood fiber crumbles prepared from one or more of western red cedar, red alder, larch, Ponderosa pine, lodgepole pine, sugar pine, Engelmann spruce, Sitka spruce, Douglas fir, western hemlock and mountain hemlock, and a method for making the same. The wood fiber crumbles are intended particularly for use as animal litter, for example, a cat litter; the crumbles can also be used for a petroleum spill absorbent, a floor sweeping material, and a mulch.

2. Description of the Prior Art:

An animal litter for domestic pets such as cats, dogs, mice, gerbils, birds, and the like, should have the following desirable qualities: high absorbency of animal excretions, ability to rapidly minimize unpleasant odors, nonadherence to animal paws and fur, biodegradability, and low cost. In addition, the litter should contain an inhibitor of the growth of microorganisms; it should repel insect pests, for example, fleas and moths; and it should contain little or no dust. Preferably, the manufacture of the litter should utilize industrial or agricultural waste products to alleviate the problem of waste disposal.

Clay materials and other inorganic absorbents have long been used as animal litter, but, except perhaps for their low cost, these lack the above-listed desirable qualities. A variety of fibrous organic absorbent materials have also been used in animal litter, for example, wood fiber products, peat moss, corn cob pulp, beet pulp, peanut hulls, sugar cane stalks, etc., and chlorophyll containing plants such as alfalfa. See, e.g., Lojek, et al., U.S. Pat. No. 4,676,196. Although such organic absorbent materials are generally biodegradable, they are not sufficiently effective in minimizing odor, nor are they generally effective in inhibiting the growth of microorganisms or in repelling insect pests.

To enhance the odor minimizing capability of such fibrous organic materials, Carlberg, U.S. Pat. No. 4,157,696, described a method for intimately mixing cellulose fibers, e.g., powdered agricultural wastes, with flyash, and pelletizing the mixture, whereby the flyash effectively deodorized animal excretions.

White, U.S. Pat. No. 3,828,731, described the addition of chlorophyll containing compounds and microbial inhibitors to high purity alphacellulose paper stock fibers as an effective way to restrict and minimize odors in animal litter. Ground sagebrush particles and sagebrush oil were reported by Stapley, U.S. Pat. No. 4,355,593, as effective for minimizing odors when added to a variety of absorbent litter materials. A number of heterocyclic antimicrobial compounds are known, but these are difficult to substantively bind to cellulosic fibrous material; nevertheless, Brasseur, U.S. Pat. No. 4,618,496, described a method for substantively binding antimicrobial heterocylcic compounds to peat moss to create a composition useful for absorbing body fluids.

The present invention seeks to achieve all the above-listed desirable qualities of an animal litter by utilizing wood wastes, that is, bark, sawdust, lumber and/or chips of western red cedar, red alder, larch, Ponderosa pine, lodgepole pine, sugar pine, Engelmann spruce, Sitka spruce, and Douglas fir in the manufacture of wood fiber crumbles. In particular, the invention takes advantage of the unique characteristics of each of these kinds of wood by combining them to achieve the desired goals. For instance, western red cedar has a natural oil that repels fleas and several types of moths. Red alder has a very high nitrogen content. Ponderosa pine has oils that are antimicrobial. Although the unique characteristics of these woods have been known and utilized previously in animal litter, they have not heretofore been combined in a single litter. As a first example, Rowell, U.S. Pat. No. 4,258,659, described an apparatus and method for making animal litter from super dry particles of softwood waste matter, using as examples of the types of litter material white pine, red pine, jack pine, Norway Pine, and the like. As a second example, Harsh, et al., U.S. Pat. No. 4,386,579, disclosed an animal litter consisting of comminuted cedar in a discrete bottom layer and an overlying layer of absorbent soil, such as diatomaceous earth and clays, wherein the soil and cedar were in unmixed, unbound relationship. As a third example, Fry, U.S. Pat. No. 3,941,090, described a composition and process for making pellets of cedar particles admixed with dehydrated alfalfa binder, which pellets have insect-repellant characteristics.

Billings, U.S. Pat. No. 4,788,936, disclosed a method for bedding animals and treating sludge using aspen or poplar barkbased pellets. High absorbency of animal excretions was thereby achieved, but no combination of antimicrobial and insect pest repelling wood oils such as that of the present invention was utilized.

Moreover, although animal litter in the form of pellets is well known in the prior art, this invention achieves a marked increase in absorbency of liquids by the additional step of grinding the pellets to wood fiber crumbles.

SUMMARY AND OBJECTS OF THE INVENTION

Therefore, it is an object of the present invention to provide wood fiber crumbles, and a method for manufacturing the same, utilizing ground bark, sawdust, lumber and/or chips of selected types of wood, that is suitable for use as an animal litter.

It is a further object of this invention to provide wood fiber crumbles for use as an animal litter that are highly absorbent of animal excretions, capable of rapidly minimizing unpleasant odors, nonadherent to animal paws and fur, biodegradable, low in cost, inhibitory of the growth of microorganisms, repellant to insect pests, and essentially free of dust.

It is a still further object of this invention to provide wood fiber crumbles, and a method for manufacture of the same, suitable for absorbing spilled petroleum.

It is another object of this invention to provide wood fiber crumbles suitable for use as floor sweeping material and capable of absorbing water, gasoline, engine oil, butchery offal, and the like.

It is still a further object of this invention to provide wood fiber crumbles, and a method for making the same, for use as a mulch.

It is another object of this invention to provide wood fiber crumbles for use as a mulch to add nitrogen to the soil.

It is still another object of this invention to provide wood fiber crumbles for use as a mulch to remove nitrogen from the soil.

Other objects and advantages of the invention will be apparent from the following description.

DETAILED DESCRIPTION OF THE INVENTION

The invention provides wood fiber crumbles produced by combining and admixing ground and dried wastes from selected types of wood, moistening the admixed grists, pelletizing in a conventional manner, and grinding the pellets to form wood fiber crumbles. If the crumbles are to be used as animal litter, they are preferably screened for selection of those with major dimension larger than one sixty-fourth inch and less than one quarter inch. Depending on which characteristics of the trees are desired to be incorporated into the crumbles, one or more of the grists of the following types of wood are combined: western red cedar (*Thuja plicata*), larch (*Larix occidentalis*), red alder (*Alnus rubra*), Ponderosa pine (*Pinus ponderosa*), lodge-pole pine (*Pinus contorta*), sugar pine (*Pinus lambertiana*), Douglas fir (*Pseudotsuga taxifolia* or *menziesii*), Sitka spruce (*Picea sitchenis*), Engelmann spruce (*Picea engelmannii*), mountain hemlock (*Tsuga mertensiana*) and/or western hemlock (*Tsuga heterophylla*). Western red cedar, however, cannot be utilized alone; in order to form satisfactory pellets, grist of western red cedar must be combined and admixed with grist of at least one of the other listed types of wood. Furthermore, grists of western hemlock and mountain hemlock are toxic to animals so that they should be omitted when the wood fiber crumbles are to be used for animal litter; as described below, however, western hemlock and/or mountain hemlock should be used whenever the crumbles are to be used as a mulch to remove nitrogen from the soil.

When it is desired to use the wood fiber crumbles as an animal litter, the preferred method of making wood fiber crumbles is as follows. Bark, sawdust, lumber and/or chips of wood selected from preferably one or more of western red cedar (but not just western red cedar), red alder, larch, Ponderosa pine, lodgepole pine, sugar pine, Engelmann spruce, Sitka spruce, and Douglas fir, are ground in a hammer mill to a fine grist. The grists are dried by heating to a maximum moisture content of 3% by weight. The grists are combined and admixed. A preferred ratio of combination of grists for use as an animal litter is 10 to 25% by weight western red cedar with 75 to 90% by weight of one of red alder, larch, Ponderosa pine, lodgepole pine, sugar pine, Engelmann spruce, Sitka spruce or Douglas fir; or, alternatively, 10 to 25% by weight western red cedar with 75 to 90% of any combination of red alder, larch, Ponderosa pine, lodgepole pine, sugar pine, Engelmann spruce, Sitka spruce or Douglas fir. The combined and admixed grists are then moistened to 12 to 16% moisture by weight. The moistened, admixed grists are pelletized in a conventional animal feed pelletizer. The size of the pellets is unimportant. The addition of moisture produces pellets with a tendency to crumble in a pelletized product that would otherwise come out as a standard wood pellet.

The pellets are ground in a corn grinder, thereby forming crumbles of varying sizes. For use as animal litter, the crumbles preferably have major dimension larger than one sixty-fourth inch and less than one quarter inch. Accordingly, in the preferred embodiment, the crumbles are next screened through a one quarter inch screen to separate larger crumbles from smaller crumbles. The smaller crumbles may then be screened through a Number 2 shaker screen, thereby collecting crumbles with major dimension larger than one sixty-fourth inch and less than one quarter inch. The larger crumbles, that is, those with major dimension larger than one quarter inch may be ground again in the corn grinder for further screening. The wood fiber crumbles so produced absorb liquid far more quickly and in greater volume than do the pellets. To reduce wood fiber dust, dust is preferably vacuumed away from the crumbles during or after the final screening.

Although the above-specified types of wood generally provide a pleasant aroma, the aroma of the wood fiber crumbles can be enhanced, and growth of microorganisms can be inhibited, by adding four to six drops of an aroma enhancer to each 10 pounds of crumbles during or after final screening. Preferably, and by way of example only, a concentrated extract of cedar oil, e.g., CEDAR ROUGE (trademark) manufactured by Custom Essence, Inc., Nuttley, N.J., can be added to the crumbles. As an animal litter for common household pets, the wood fiber crumbles are spread to a height of 2 inches or more.

To make wood fiber crumbles suitable for absorbing petroleum, for example to clean up a petroleum spill at sea, the method is as follows. Bark, sawdust, lumber and/or chips of wood selected from one or more of red alder, larch, Douglas fir, lodgepole pine, Ponderosa Pine, sugar pine, Engelmann spruce, Sitka spruce, but not western red cedar, are ground to a fine grist. The grists are combined and admixed. The remainder of the method is the same as for manufacture of wood fiber crumbles intended for animal litter except that one would dispense with adding an aroma enhancer. In use, the crumbles are sprinkled on the spilled petroleum, which causes the petroleum to agglomerate thereby facilitating removal of globs of petroleum for possible further processing.

The method is essentially the same for making wood fiber crumbles for use as a floor sweeping material capable of absorbing aqueous and oleaginous liquid spills, for example, water, gasoline, engine oil, butchery offal, etc. Preferably, in making crumbles for floor sweeping material, grists of larch, lodgepole pine, Ponderosa pine, sugar pine, western hemlock, mountain hemlock, red alder, Engelmann spruce, and/or Sitka spruce are combined in any desired proportions. A light sprinkle of the crumbles on a floor is all that is needed as this material will absorb 300 to 400% of its own weight in moisture.

To make a mulch from wood fiber crumbles, as for enrichment of garden soil, that will add nitrogen to the soil, the method is as follows. Bark, sawdust, lumber and/or chips of red alder is ground to a fine grist. The grist is dried to a maximum moisture content of 3% by weight. The grist is moistened to 12 to 16% moisture content by weight. The moistened grist is pelletized to form pellets. The pellets are ground to form crumbles.

To make a mulch from wood fiber crumbles that will remove nitrogen from the soil, the method is as follows. Bark, sawdust, lumber, and/or chips of western hemlock and/or mountain hemlock is ground to a fine grist. The grist is dried to a maximum, moisture content of 3% by weight. The grist is moistened to 12 to 16% moisture content by weight. The moistened grist is pelletized to form pellets. The pellets are ground to form crumbles.

Accordingly, it is seen that combination and admixture of grists of selected woods followed by a sequence of drying, moisturizing, pelletizing, grinding the resultant pellets to form crumbles, and screening for the desired range of sizes of crumbles, yields wood fiber crumbles with the desired characteristics. Depending upon the woods selected, these characteristics include rapid and efficient absorbtion of animal excretions or of petroleum spills, substantial elimination of unpleasant odors, inhibition of the growth of microorganisms, the capability to repel insect pests, and the capability to add or remove nitrogen from the soil when used as a mulch.

We claim:

1. A method of making wood fiber crumbles, comprising the steps of:
   (a) grinding bark, sawdust, lumber and/or chips to form grists of two or more types of wood consisting of western red cedar, red alder, larch, Ponderosa pine, lodgepole pine, sugar pine, Engelmann spruce, Sitka spruce, Douglas fir, western hemlock and mountain hemlock;
   (b) drying the grists to a maximum moisture content of 3% by weight;
   (c) combining and admixing the grists;
   (d) moistening the admixed grists to 12 to 16% moisture content by weight;
   (e) pelletizing the moistened admixed grists to form pellets; and
   (f) grinding the pellets in a corn grinder to form crumbles.

2. The method of claim 1 further comprising the additional steps of:
   (g) selecting and collecting crumbles with major dimension larger than one sixty-fourth inch and less than one quarter inch.

3. The method of claim 2 wherein step (c) includes combining and admixing 10 to 25% by weight western red cedar grist with 75 to 90% by weight grist ground from one of red alder, larch, Ponderosa pine, lodgepole pine, sugar pine, Douglas fir, Engelmann spruce or Sitka spruce, or with 75 to 90% by weight grists ground from any combination of red alder, larch, Ponderosa pine, lodgepole pine, sugar pine, Douglas fir, Engelmann spruce and Sitka spruce, to make wood fiber crumbles for use as an animal litter.

4. The method of claim 2 wherein step (g) includes
   screening the crumbles through a one-quarter inch screen to separate larger crumbles from smaller crumbles; and
   screening the smaller crumbles through a one sixty-fourth inch mesh screen, thereby collecting crumbles with major dimension larger than one sixty-fourth inch and less than one quarter inch.

5. The method of claim 2 further comprising grinding in a corn grinder the larger crumbles again after step (g) to form additional smaller crumbles and then selecting and collecting said additional smaller crumbles.

6. The method of claim 2 further comprising removing wood fiber dust during or after step (g).

7. The method of claim 2 further comprising adding a quantity of an aroma enhancer to the crumbles after step (g) to enhance the aroma thereof.

8. The method of claim 7 wherein the aroma enhancer added is four to six drops of Western Red Cedar extract oil per 10 pounds of wood fiber crumbles.

9. The method of claim 1 wherein step (c) includes combining and admixing one or more grists of alder, larch, Douglas fir, Engelmann spruce, Sitka Spruce, spruce, Ponderosa pine, lodgepole pine, and/or sugar pine, but not western red cedar, to prepare wood fiber crumbles suitable for absorbing petroleum spills.

10. Wood fiber crumbles prepared by the method of claim 1, 2, 3, 4, 5, 6, 7, 8, or 9.

11. A method of providing an animal litter, comprising spreading wood fiber crumbles prepared by the method of claim 1, 2, 3, 4, 5, 6, 7 or 8 to a height of 2 inches or more.

12. The method of providing a mulch to add nitrogen to soil, comprising the steps of:
    (a) grinding red alder bark, sawdust, lumber and/or chips to form grist;
    (b) drying the grist to a maximum moisture content of 3% by weight;
    (c) moistening the grist to 12 to 16% moisture content by weight;
    (d) grinding the pellets in a corn grinder to form crumbles.

13. A method of providing a mulch to remove nitrogen from the soil, comprising the steps of:
    (a) grinding western hemlock and/or mountain hemlock bark, sawdust, lumber and/or chips to form grist;
    (b) drying the grist to a maximum moisture content of 3% by weight;
    (c) moistening the grist to 12 to 16% moisture content by weight;
    (d) pelletizing the moistened grist to form pellets; and
    (e) grinding the pellets in a corn grinder to form crumbles.

14. A method of providing a floor sweeping material, comprising the steps of:
    (a) grinding bark, sawdust, lumber, and/or chips to form grists of one or more of western red cedar, larch, Ponderosa pine, lodgepole pine, sugar pine, Engelmann spruce, Sitka spruce, western hemlock, mountain hemlock, and red alder;
    (b) drying the grists to a maximum moisture content of 3% by weight;
    (c) moistening the grists to 12 to 16% moisture content by weight;
    (d) pelletizing the moistened, combined grists to form pellets; and
    (e) grinding the pellets in a corn grinder to form crumbles.

* * * * *